H. E. WEBBER.
FRUIT PICKER.
APPLICATION FILED JUNE 4, 1918.
1,293,588. Patented Feb. 4, 1919.
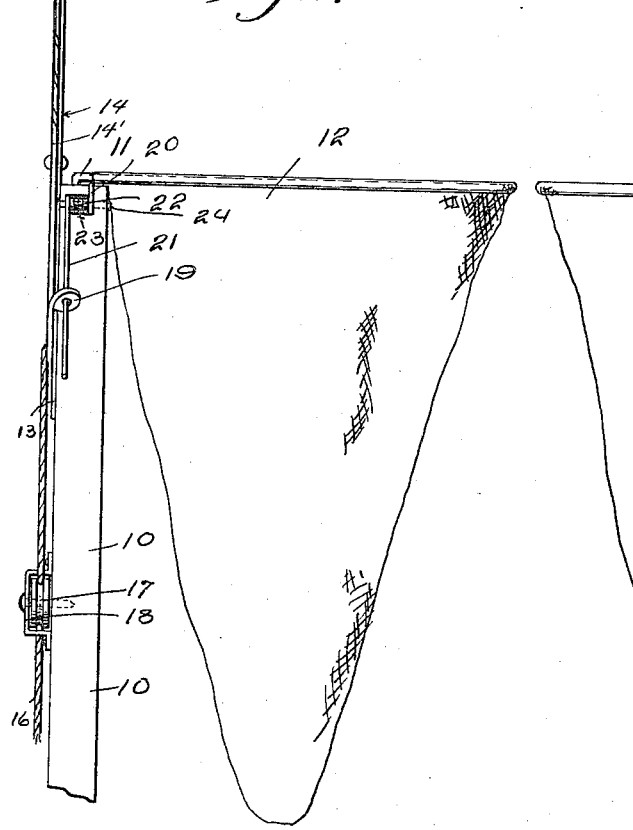
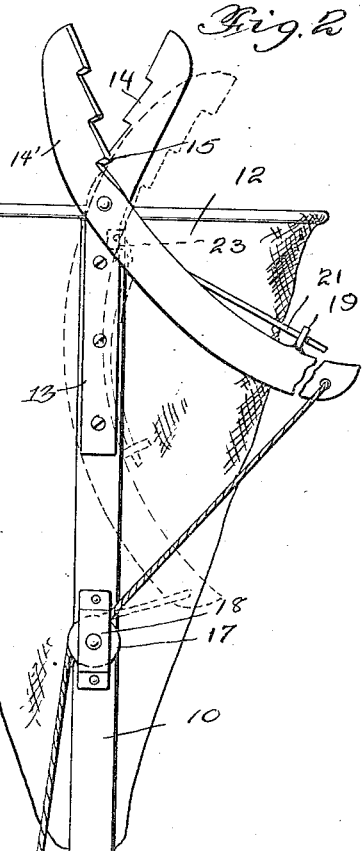
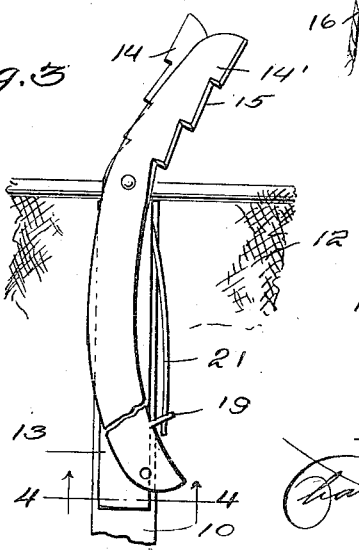
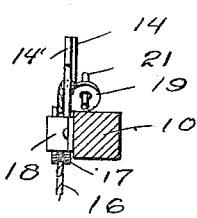
Witness
Inventor
H. E. Webber
by
Attorney

UNITED STATES PATENT OFFICE.

HENRY E. WEBBER, OF WOODBURY, VERMONT.

FRUIT-PICKER.

1,293,588.      Specification of Letters Patent.      Patented Feb. 4, 1919.

Application filed June 4, 1918. Serial No. 238,144.

*To all whom it may concern:*

Be it known that I, HENRY E. WEBBER, a citizen of the United States, residing at Woodbury, in the county of Washington, State of Vermont, have invented certain new and useful Improvements in Fruit-Pickers; and I do hereby declare the following to be a full, clear, and exact description of the invention, such as will enable others skilled in the art to which it appertains to make and use the same.

This invention relates to improvements in fruit pickers and particularly to a device for cutting the stems of fruit which will fall into a bag.

One object of the present invention is to provide a novel and improved device of this character which includes novelly formed cutting elements whereby the cutting of the stem is assured.

Another object is to provide a novel and improved cutting means which includes a means for holding one end of the actuating spring and which also serves as a stop to prevent the cutting blades from moving too far toward or beyond their cutting position.

Other objects and advantages will be apparent from the following description when taken in connection with the accompanying drawing.

In the drawing:

Figure 1 is a side elevation of a fruit picking device made in accordance with my invention.

Fig. 2 is a rear elevation of the device.

Fig. 3 is a rear elevation of the device with the cutting blades in closed position.

Fig. 4 is a horizontal sectional view taken on the line 4—4 of Fig. 3, looking upwardly, to show the action of the stop lug.

Referring particularly to the accompanying drawing, 10 represents a pole to the upper end of which is secured a circular wire frame 11, a suitable canvas or other bag 12 being secured to said ring and depending therefrom to catch the fruit as the stems are cut. Secured on one side of the upper end of the pole is a metal strip 13, the upper portion of which is extended at an obtuse angle to the main portion thereof, and in the same plane therewith. On the inner edge of this member 13 there are formed the serrations 14, the portions of said edge, between the shoulders of the serrations, being sharpened. Pivotally connected to the strip 13, at the angle thereof, is an arcuate strip 14', of metal having the upper portion of one of its edges formed with serrations 15, sharpened in the same manner as the serrations of the strip 13. To the lower end of the strip 14' there is attached one end of a cord or wire 16, the same being passed over a grooved wheel 17 mounted in a bracket 18 on the pole beneath the lower end of the strip 13. The remainder of the cord or wire depends down the length of the pole and is adapted to be grasped and pulled by the operator to rock the member 14' on its pivot and move the cutting edge thereof over into coöperative relation with the cutting edge of the member 13 to sever the stem of the fruit brought therebetween.

Formed integrally on the inner curved edge of the member 14', at a point intermediate the pivot and lower end thereof, is an apertured lug 19. A strip of spring wire has one end secured to the upper end of the pole and its other end disposed through the apertured lug, as clearly shown at 20 and 21, respectively. The wire, adjacent the upper end of the pole, is formed with several coils 22 which are disposed in a recess 23 in the side face of the pole, and through the pole and the said coils, is disposed a pin 24 which holds the coils within the recess.

When the cutting element 14' is swung on its pivot into cutting position, as shown in Figs. 3 and 4, the lug 19 will engage with the side of the pole and prevent further pivotal movement of the cutting element. This also prevents the member 14' from being moved into such position that it would be difficult to release the same without lowering the whole device from the tree. This would be inconvenient for the operator and would entail the loss of time.

Thus the lug serves as a retainer for the end of the spring and also as a stop for the pivoted cutting member.

What is claimed is:

A fruit picker including a pole, a receptacle carried by the upper end of the pole, a stationary arcuate cutting element carried by the pole adjacent the mouth of the receptacle and having a serrated cutting edge, a pivoted serrated cutting element mounted on the stationary element and having a serrated cutting edge arranged to coöperate with the first cutting edge to cut the stems of fruit, a lug formed integrally on one side of the pivoted element, a spring secured to the pole and having one end disposed through the said lug to normally urge the cutting elements apart, said lug being arranged to engage with the pole to limit the pivotal movement of the cutting element in one direction.

In testimony whereof, I affix my signature, in the presence of two witnesses.

HENRY E. WEBBER.

Witnesses:
LILLIAN M. TASSIE,
R. B. DANIELS.

Copies of this patent may be obtained for five cents each, by addressing the "Commissioner of Patents, Washington, D. C."